(12) United States Patent
Muta et al.

(10) Patent No.: US 6,377,271 B1
(45) Date of Patent: Apr. 23, 2002

(54) IMAGE DATA TRANSFERRING SYSTEM, APPARATUS AND METHOD

(75) Inventors: Hidemasa Muta; Tatsuya Sobue, both of Yokohama; Aya Mori, Yamato, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/293,643

(22) Filed: Apr. 17, 1999

(30) Foreign Application Priority Data

Apr. 21, 1998 (JP) .......................................... 10-110340

(51) Int. Cl.[7] ................................................ G06T 1/20
(52) U.S. Cl. ........................ 345/600; 345/605; 709/200
(58) Field of Search ................................... 345/501, 502, 345/535, 549, 600, 605; 709/200, 246, 247, 230, 232, 233

(56) References Cited

U.S. PATENT DOCUMENTS 5,838,906 A * 11/1998 Doyle et al. ................ 709/200

OTHER PUBLICATIONS

Leonard, "Color image compression finally heads for maturity", Electronic Design, v39, N10, p55(5), May 23, 1991.*

* cited by examiner

*Primary Examiner*—Kee M. Tung
(74) *Attorney, Agent, or Firm*—David M. Shofi; Anne Vachon Dougherty (57) ABSTRACT

The image data transferring apparatus of this invention determines that the change in the image is very small when a change in the image is not detected during a given time period, for example, and generates transmission data which causes image data displaying a full color image of, for example, 24 bits per pixel to be displayed in the receiving side in a relatively small number of frames in a unit time for transmission. Conversely, the image data transferring apparatus transmits reduced color data which is reduced from 24 bits per pixel to 4 bits per pixel in a relatively large number of frames in a unit time to the receiving side when it is determined that many changes are included in the image.

8 Claims, 10 Drawing Sheets

IMAGE DATA TRANSFERRING SYSTEM, APPARATUS AND METHOD

FIELD OF THE INVENTION

This invention relates to an image data transferring system, an image data transferring apparatus and a method thereof for efficiently transferring image data including a GUI (graphical user interface) image through a network.

BACKGROUND OF THE INVENTION

It has been popularly practiced to transfer image data via a network and display the transferred data for example, by connecting a personal computer to the internet to display image data from the world wide web (WWW). For example, PUPA 8-130656 discloses an invention to change the number of colors of image data depending on the movement of an image. Image data generally contains a large amount of data and needs a long time for being transmitted via a network. For this reason, when an image containing many changes is transmitted, the bandwidth (transmission rate) of the network cannot follow the change of the image, inducing a problem that the display of the image is disturbed or the movement of the image is not natural. In order to solve such a problem, it may be considered to apply the invention disclosed in the aforementioned Japanese reference relating to a method for taking in a color image to the transmission of image data. However, the method described therein discloses none of the technical matters required for applying it to the transmission of image data via a network. Even if the described method could be applied to image data transmission, a user would have to continually pay attention to the change of the image and change the number of colors of the data every time the degree of the change of the image varies.

The present invention is conceived in view of the problem of the prior art described in the above and aims at providing an image data transferring system, an image data transferring apparatus and a method thereof for efficiently transferring image data via a network.

It is, therefore, an object of this invention to provide an image data transferring system, an image data transferring apparatus and a method thereof which can optimize the quality of an image and the change of the image depending on the bandwidth (transmission rate) of the network by adjusting the amount of image data depending on the change of the image, i.e., transmitting more images with less amount of data when images of many changes are transmitted while transmitting a high quality image with a larger amount of data when the change of the image is less.

It is another object of this invention to provide an image data transferring system, an image data transferring apparatus and a method thereof which can automatically switch between an image of reduced color and an image of color which is not reduced for displaying the image, without requiring the user to monitor the change of the image and operate depending on the change.

It is yet another object of this invention to provide an image data transferring system, an image data transferring apparatus and a method thereof which can adjust the amount of image data depending on the movement of the image and transmit an image of a necessary and sufficient quality from a transmitting side to a receiving side to reduce the load on a server device supplying the image data and reduce the load on the network.

SUMMARY OF THE INVENTION

These and other objects are realized by the present invention comprising an image data transferring system for transferring data from an image data transmitting apparatus to an image data receiving apparatus, said image data transmitting apparatus comprising; reduced data generating means for generating reduced data by reducing the amount of data of continuously inputted image data (input data), delta data generating means for generating image data of the delta between said input data and said reduced data (delta data), delta detection means for detecting a delta between consecutive ones of said input data, and image data transmitting means for transmitting to said image data receiving means said transmission data with identifier data attached thereto indicating that it is said delta data when no delta is detected between consecutive ones of said input data for a predetermined period and transmitting said transmission data with identifier data attached thereto indicating that it is said reduced data when a delta is detected between consecutive ones of said input data for a predetermined period, said image data receiving apparatus comprising; transmission data receiving means for receiving said transmission data, and image displaying means for displaying an image indicated by said reduced data included in said transmission data when said identifier data of the received transmission data indicates that it is said reduced data, and displaying the image indicated by said reduced data with the image indicated by said delta data added thereto when said identifier data of the received transmission data indicates that it is said delta data.

This invention also provides an image data transferring apparatus for transmitting transmission data to an image data receiving apparatus which receives said transmission data and displays, when said identifier data of the received transmission data indicates that it is reduced data, which is image data consecutively inputted to said image data transmitting device (input data) subtracted by a data amount, an image indicated by said reduced data included in said transmission data, and displays, when said identifier data of the received transmission data indicates that it is delta data which is the delta between said input data and said reduced data, the image indicated by said reduced data with the image indicated by said delta data added thereto, said image transferring apparatus comprising; reduced data generating means for generating said reduced data, delta data generating means for generating said delta data, delta detection means for detecting a delta between consecutive ones of said input data, and image data transmitting means for transmitting to said image data receiving apparatus said transmission data with identifier data attached thereto indicating that it is said delta data when no delta is detected between consecutive ones of said input data for a predetermined period and transmitting said transmission data with an identifier data attached thereto indicating that it is said reduced data when a delta is detected between consecutive ones of said input data for a predetermined period.

Preferably, said reduced data generating means generates reduced color data having data amount reduced by reducing the number of colors of said input data as said reduced data, said delta data generating means generates said delta data indicating the delta between said input data and said reduced color data, said delta detection means detects said delta when there is a delta between said input data and the input data inputted before or after said former input data, and said image data transmitting means transmits said reduced color data or said delta data with said identifier data added thereto as said transmission data depending on whether or not a delta is detected in the input data.

Preferably, said image data receiving apparatus displays the image indicated by said reduced data with an image indicated by reduced data which is received later than said former reduced data added thereto, said delta data generating means stores said inputted input data (first input data) to generate input delta data indicating a delta between said stored first input data and input data which is inputted after said stored first input data (second input data) and generates said reduced color data by reducing the number of colors of said generated input delta data, and said delta data generating means reduces the number of colors of said stored first input data to generate said delta data by taking the delta between said first input data and said color reduced first input data.

The image data transmitting apparatus of this invention transmits transmission data for displaying an image without reducing the number of colors thereof when there is no delta in the image over a predetermined period, and transmission data for displaying the image with the number of colors reduced when there is a delta in the image in the predetermined period to an image data receiving apparatus having a specific function for display therein via an arbitrary communication network such as LAN, an ISDN communication network, or the internet.

An image data receiving apparatus which displays an image transmitted from the image data transferring apparatus of this invention is required to have a function to generate an image from the transmitted data and display it as described hereunder. The image data receiving apparatus receives via a communication network transmission data transmitted from a transmitting side (image transferring apparatus). The transmission data is associated with identifier data indicating whether the image data included in the transmission data is color reduced data of an image in which the number of colors of an original image, which is not color reduced (full color image), are reduced to 16 colors (color reduced image) or delta data which is used to generate a full color image by adding it to the color reduced image so far displayed in the image data receiving apparatus. The image data receiving apparatus displays an image based on the identifier data associated with the transmission data. Specifically, the image data receiving apparatus generates an image indicated by color reduced data when the identifier data indicates color reduced data while it generates a full color image by adding an image indicated by delta data to a color reduced image so far displayed when the identifier data indicates delta data for display in a display device such as a CRT display.

When the transmitting side color reduces only the delta between changing images to transmit color reduced data in order to reduce the data amount of transmitted data, the image data receiving apparatus adds the image of the newly received color reduced data to the color reduced image so far displayed when color reduced data is received in the manner similar to the case when delta data is received.

In the image data transferring apparatus, the reduced data generating means reduces the number of colors of the image of full color image data of 24 bits per pixel to 16 colors to generate reduced data (color reduced data) in which the data amount is reduced to 4 bits per pixel. Alternatively, the reduced data generating means takes the delta between 2 frames which are consecutively inputted and assumes a change and further color reduces the delta into color reduced data. The reduced data may be generated by another method such as by eliminating data from the original image data. The inputted data may be continually inputted in a given period in the manner, like animation image data, or the changed portion may be continually but irregularly inputted in response to an operation by a user in the manner like a GUI image.

The delta data generating means generates differential image data indicating the delta between a full color image data and a color reduced image data. The delta detecting means takes the delta between full color image data for 2 frames consecutively inputted, for example, and determines that there is no delta between full color image data for the 2 frames when there is no delta or when an accumulation of the absolute value of the delta of each pixel is below a given threshold value.

The image data transmitting means determines that there is no delta, or there is a small delta in an image when a delta is not detected between consecutive p frames (p is an integer arbitrarily set) or when a delta is not detected in a given period, for example, and associates the delta data, which includes a larger data amount in comparison to the color reduced data and consumes longer time for transmission with identifier data which indicates that the data to be transmitted is delta data, to generate transmission data which causes a relatively small number of images to be displayed in the receiving side (image data receiving apparatus) in a given time for transmission to the receiving side.

Conversely, when a delta is detected between the images in a given period, the image data transmission means determines that the images involve a substantial change and associates the color reduced data, which includes a reduced data amount in comparison to the delta data and consumes shorter time for transmission with identifier data which indicates that the data to be transmitted is color reduced data, to generate transmission data which causes a relatively large number of images to be displayed in the receiving side in a given time for transmission to the receiving side.

This invention provides an image data transferring method for transferring data from an image data transmitting apparatus to an image data receiving apparatus, said method comprising the steps effected in said image data transmitting apparatus of: generating reduced data by reducing the amount of data of continuously inputted image data (input data), generating image data of the delta between said input data and said reduced data (delta data), detecting a delta between consecutive ones of said input data, and transmitting to said image data receiving apparatus said transmission data with an identifier data attached thereto indicating that it is said delta data when no delta is detected between consecutive ones of said input data for a predetermined period and transmitting said transmission data with an identifier data attached thereto indicating that it is said reduced data when a delta is detected between consecutive ones of said input data for a predetermined period, and the steps effected in said image data receiving apparatus of: receiving said transmission data, and displaying an image indicated by said reduced data included in said transmission data, when said identifier data of the received transmission data indicates that it is said reduced data, and displaying the image indicated by said reduced data with the image indicated by said delta data added thereto when said identifier data of the received transmission data indicates that it is said delta data.

This invention also provides a recording medium recording a program which causes a computer to execute in an image data transferring apparatus for transmitting transmission data to an image data receiving apparatus which receives said transmission data, displays, when said identifier data of the received transmission data indicates that it is said reduced data which is image data consecutively inputted to said image data transmitting device (input data) subtracted by a data amount, an image indicated by said reduced data included in said transmission data, and displays, when said identifier data of the received transmission data indicates that it is full color image data indicating the image of said input data, the image indicated by said received transmission data with the image indicated by said full color image data added thereto, said program comprising a reduced data generating step for generating said reduced data, a full color image data generating step for generating said full color image data, a delta detection step for detecting a delta between consecutive ones of said input data, and an image data transmitting step for transmitting to said image data receiving apparatus said transmission data with an identifier data attached thereto indicating that it is said delta data when no delta is detected between consecutive ones of said input data for a predetermined period and transmitting said transmission data with an identifier data attached thereto indicating that it is said reduced data when a delta is detected between consecutive ones of said input data for a predetermined period.

Preferably, said full color image data is delta data of a delta between said input data and said reduced data and said image data receiving apparatus displays an image indicated by said reduced data with an image indicated by said delta data when said identifier data indicates said delta data, said medium recording a program which causes said reduced data generating step to execute a process of generating color reduced data having a data amount reduced by reducing the number of colors of said input data as said reduced data, causes said full color image data generating step to execute a process of generating said delta data indicating the delta between said input data and input data inputted before or after the former input data, causes said delta detecting step to execute a process of detecting said delta when there is a delta between said input data and input data inputted before or after the former input data, and causes said image data transmitting step to execute a process of transmitting said color reduced data or said delta data with said identifier data associated thereto as said transmission data depending on whether or not a delta is detected in the input data.

Preferably, said image data receiving apparatus displays an image indicated by said reduced data with an image indicated by reduced data received later than said former reduced data added thereto, said program causes said reduced data generating step to execute a process of storing said input data inputted (first input data) to generate input deferential data indicating a delta between said stored first input data and input data inputted later than said stored first input data (second input data) and generate said color reduced data by reducing the number of colors of said generated input delta data, and causes said full color image data generating step to execute a process of reducing the number of colors of said stored first input data to generate said delta data by taking a delta between said first input data and said color reduced first input data.

BRIEF DESCRIPTION OF THE DRAWINGS

The invention will now be described in greater detail with specific reference to the appended Drawings wherein.

DESCRIPTION OF THE PREFERRED EMBODIMENT

Image Data Communication System 1

Figure 1:
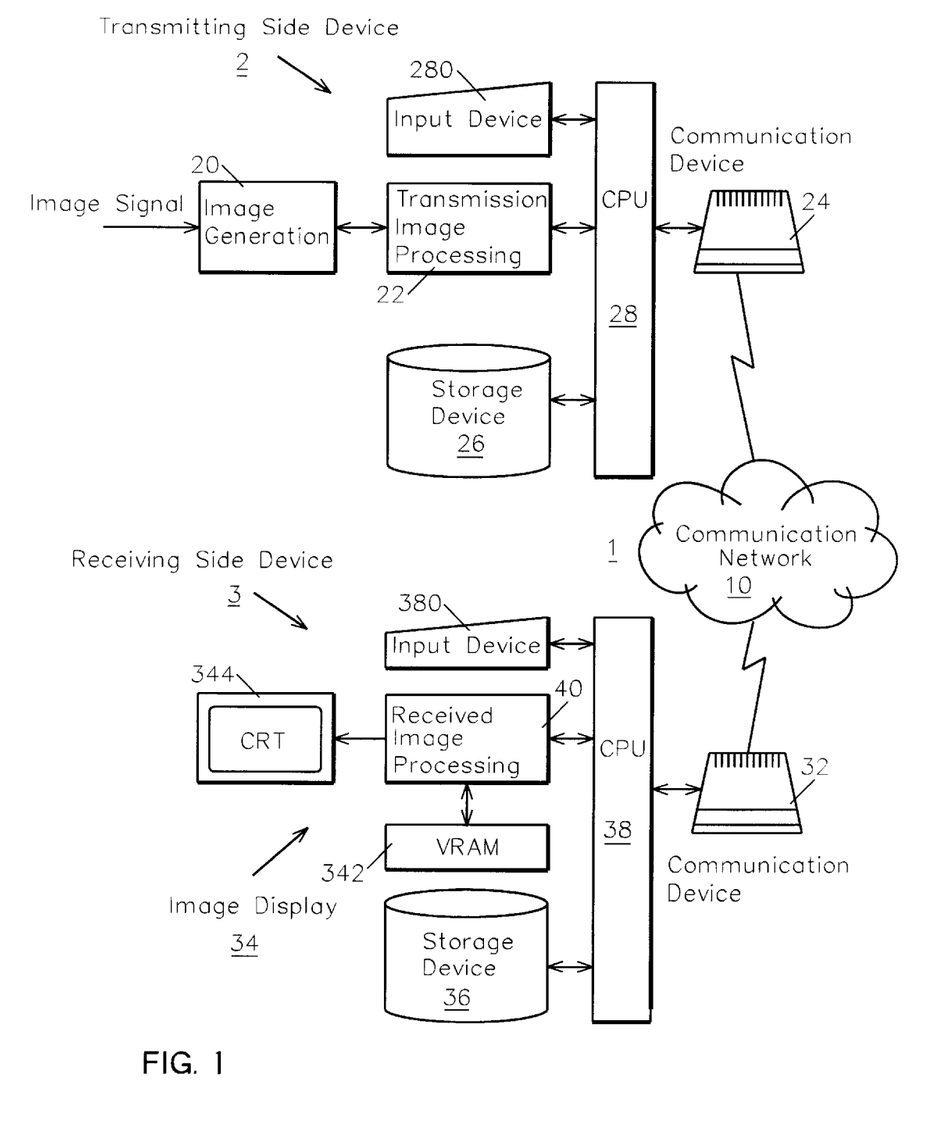
FIG. 1 is a diagram showing an example of the configuration of the image data communication system 1 of this invention.

FIG. 1 is a diagram showing an example of the configuration of the image data communication system 1 of this invention. As shown in FIG. 1, the image data communication system 1 comprises m transmitting side devices 2 and n receiving side devices 3 (m and n are integers, with FIG. 1 showing a case where m=n=1 as an example) which are connected via a communication network 10 capable of data communication including a LAN (local area network), an ISDN network, a telephone network or the internet. The communication network 10 is not necessarily required, such that the image data communication system 1 and the transmitting side devices 2 and the receiving side devices 3 may be directly connected by a cable.

Transmitting Side Device 2

The transmitting side device 2 comprises an image generating device 20, a transmission image processing device 22, a communication device 24, a storage device 26, a computer unit (CPU) 28 and an input device 280. With these components, the transmitting side device 2 does the following: processes full color image data such as a GUI image or an image taken by a digital camera (not shown); reduces the image data of 24 bits per pixel of an inputted full color image to 16 colors when there is a delta in the image; and, transmits relatively many items of color reduced image data with data amount reduced to 4 bits per pixel to the receiving side device 3 for each unit time so as to allow the bandwidth (transmission rate) of the communication network 10 to deal with the change of the image.

When there is no change in the image for a predetermined period, or when a change can be negligible (for example, when p consecutive images have almost no change, or there is almost no change in the image in a given time period), the transmitting side device 2, using the above components, transmits a relatively small number of items of differential image data which is used for complementing the color reduced image already displayed in the receiving side device 3 into a full color image per each unit time, to allow a high quality image to be displayed in the receiving side device 3 while the change of the image is low.

Image Generating Device 20

The image generating device 20 provides an interface between an external camera and a computer, for example, and processes an image signal externally inputted to generate full color image data of, for example, 24 bits per pixel. Alternatively, the image generating device 20 is a GUI display device for displaying a GUI image, for example, and for reading out full color image data indicating a GUI image from the storage device 26 and the like. The image generating device 20 outputs the generated full color image data to the transmission image processing device 22.

Computer Unit 28

The computer unit 28 encodes transmission data inputted from the transmission image processing device 22 by a run-length coding and the like and controls the communication device 24 to transmit it to the receiving side device 3 via the communication network 10. The storage device 26 receives an operation by a user on the input device 280 (keyboard, mouse, etc.) for output to the transmission image processing device 22.

The storage device 26 also stores software for implementing the function of the transmission image processing device 22, when the function of the transmission image processing device 22 is implemented by the software, and loads the stored software to the transmission image processing device 22 for execution in response to a call by the user.

Transmission Image Processing Device 22

Figure 2:
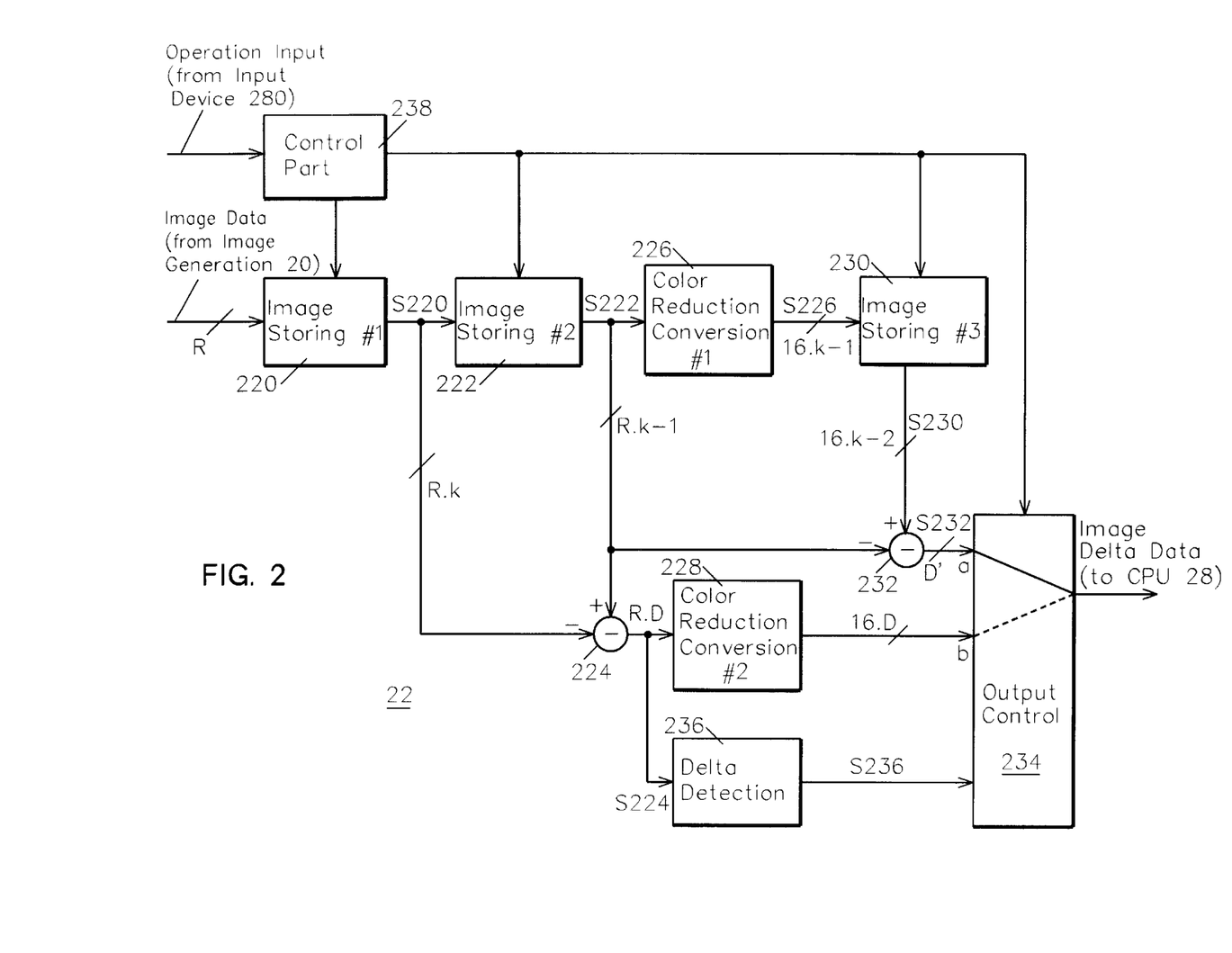
FIG. 2 is a diagram showing the configuration of the transmission image processing device 22 shown in FIG. 1.

FIG. 2 is a diagram showing the configuration of the transmission image processing device 22 shown in FIG. 1. As shown in FIG. 2, the transmission image processing device 22 comprises a first image storing part 220, a second image storing part 222, a first delta detecting part 224, a first color reduction conversion part 226, a second color reduction conversion part 228, a third image storing part 230, a second delta detecting part 232, an output control part 234, a delta detecting part 236 and a control part 238. The Configuration of these components of the transmission image processing device 22 may be modified so long as an equivalent function and performance are available and they may be configured in either software or hardware.

Image Storing Part 220

Figure 3:
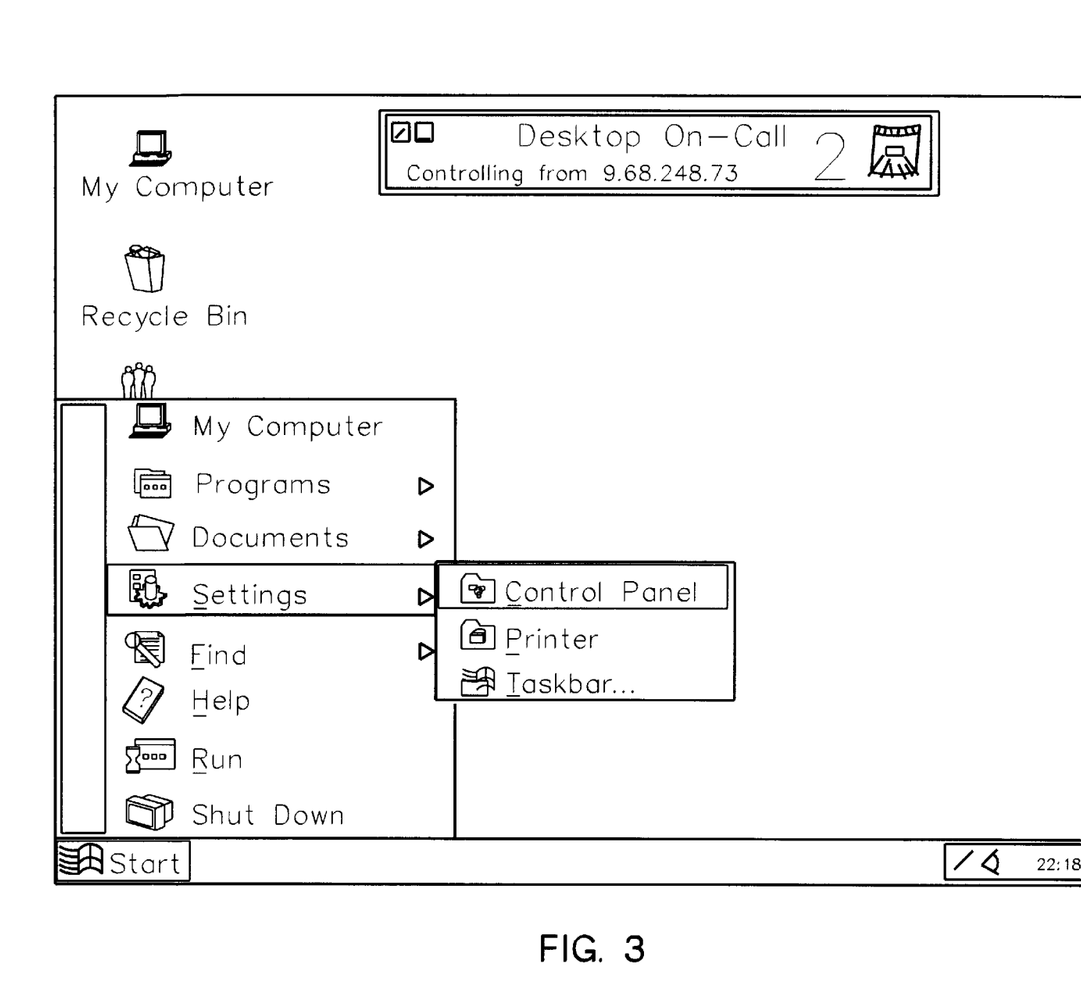
FIG. 3 is a chart showing an example of a k-th GUI image inputted to the transmission image processing device 22.
Figure 4:
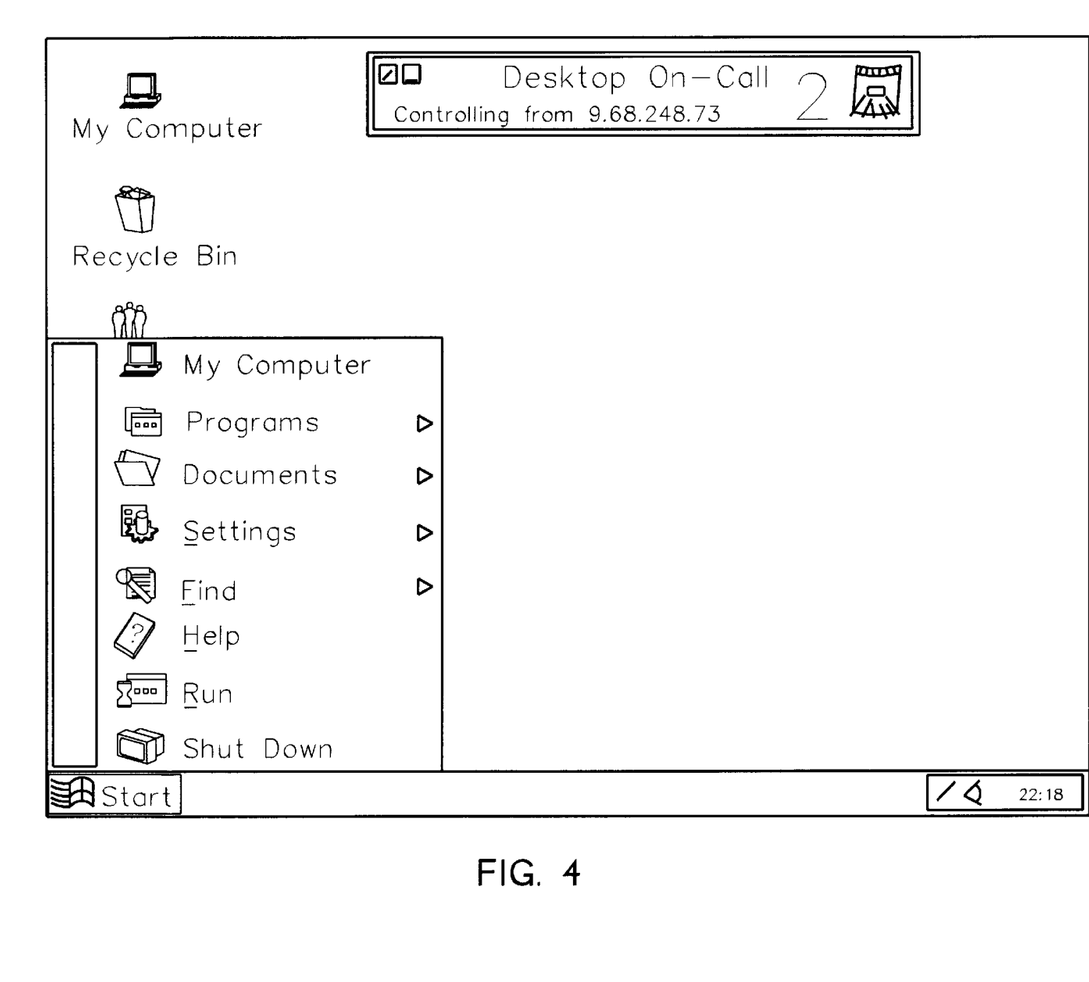
FIG. 4 is a chart showing an example of a k−1-th GUI image inputted to the transmission image processing device 22.

FIG. 3 is a chart showing an example of a k-th GUI image inputted to the transmission image processing device 22. It should be noted that FIG. 3 to FIG. 8 are shown below to help an intuitive understanding of the processes of the components of the transmission image processing device 22 and should not be strictly construed as the only means for implementing the invention. Full color image data stored in the image storing part 220 is either an entire image data of 1 frame or a portion of the image data of 1 frame which is to be modified (the rectangular region included in the frame, for example) as shown in FIG. 3 and FIG. 4.

Described below is a specific example where the transmission image proceeding device 22 processes the full color image data of the GUI image frame by frame unless specifically mentioned. The image storing part 220 stores 1 frame of the full color image (R; FIG. 3) inputted from the image generating part 20 (FIG. 1), outputs it to the delta detecting part 224 at the time when 1 frame of the full color image data has been stored, and outputs the result to the image storing part 222 at the time when a delta has been calculated in the delta detecting part 224 (S220).

Image Storing Part 222

FIG. 4 is a chart showing an example of a (k-1)th GUI image inputted to the transmission image processing device 22. The image storing part 222 stores 1 frame of full color image data (FIG. 4) inputted from the image storing part 220, in the manner similar to the image storing part 220, and outputs it to the delta detecting parts 224, 232 and 226 at the time when 1 frame of the full color image data has been stored (S222). Thus, when the image storing part 220 stores the k-th frame of the full color image data (FIG. 3), the image storing part 222 will store the k-1-th frame of the full color image data (FIG. 4).

Delta Detecting Part 224

Figure 5:
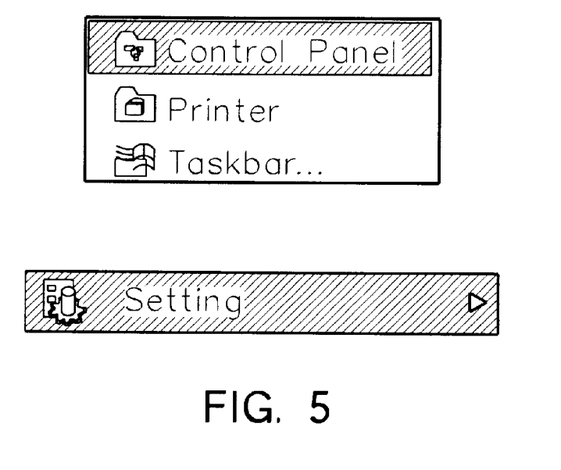
FIG. 5 is a chart showing an example of full color delta data which is outputted from the delta detecting part 224 shown in FIG. 2.

FIG. 5 is a chart showing an example of full color delta data which is outputted from the delta detecting part 224 shown in FIG. 2. The delta detecting part 224 calculates the delta between the full color image data of the k-th frame stored in the image storing part 220 (R, k; FIG. 3) and the full color image data of the (k-1)th frame stored in the image storing part 222 (R, k-1; FIG. 4) for each pixel and outputs it to the color reduction conversion part 228 and the delta detecting part 236 as full color delta data (R, D) shown in FIG. 5 (S224).

Color Reduction Conversion Part 226

Figure 6:
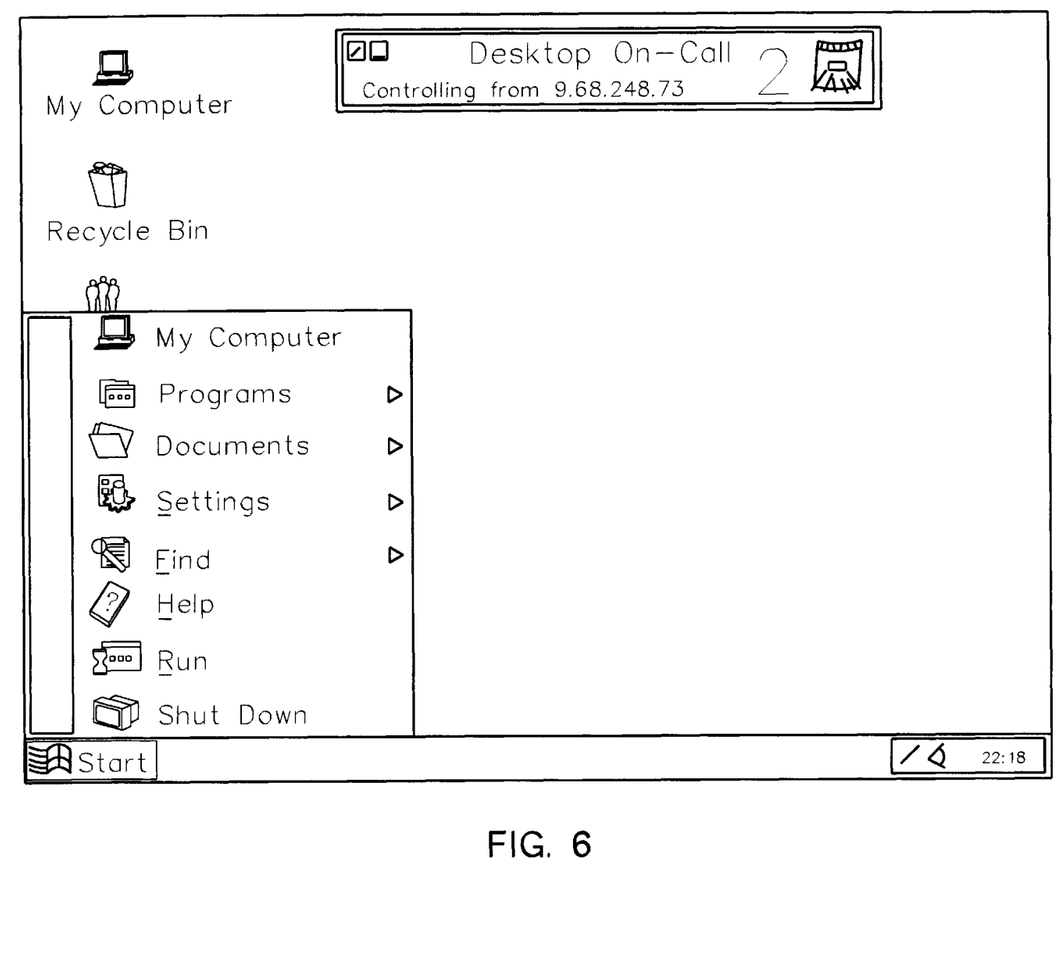
FIG. 6 is a chart showing reduced color image data which the color reduction conversion part 226 shown in FIG. 2 generates by color reducing the k−1-th full color image data shown in FIG. 4.

FIG. 6 is a chart showing reduced color image data, which the color reduction conversion part 226 shown in FIG. 2 generates by reducing the color of the (k-1)th full color image data shown in FIG. 4. The color reduction conversion part 226 reduces the full color image data (R, k-1) of 24 bits per pixel inputted from the image storing part 222 to 16 colors to reduce the data amount, and generates reduced color image data (16, k-1) of 4 bits per pixel shown in FIG. 6 for output to the image storing part 230 (S226).

Color Reduction Conversion Part 228

Figure 7:
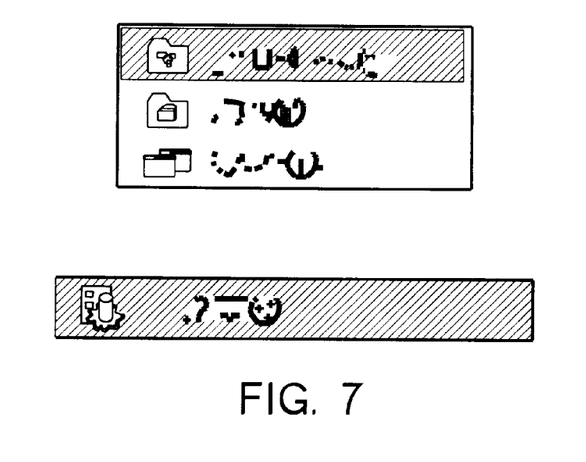
FIG. 7 is a chart showing reduced color delta data which the delta detecting part 224 shown in FIG. 2 generates by color reducing the full color delta data shown in FIG. 5.

FIG. 7 is a chart showing reduced color delta data which the delta detecting part 224 shown in FIG. 2 generates by reducing the color of the full color delta data shown in FIG. 5. The color reduction conversion part 228 reduces the full color delta data (R, D) inputted from the delta detecting part 224 to 16 colors in the manner similar to the color reduction conversion part 226 and generates reduced color delta data of 4 bits per pixel (16, D) by reducing the data amount as shown in FIG. 7 for output to the input to terminal b of the delta detecting part 236 (S228).

Image Storing Part 230

The image storing part 230 stores reduced color image data (16, k-1) inputted from the delta detecting part 224, frame by frame, and outputs it to the delta detecting part 232 at the time when reduced color image data of 1 frame has been stored (S230).

Delta Detecting Part 232

Figure 8:
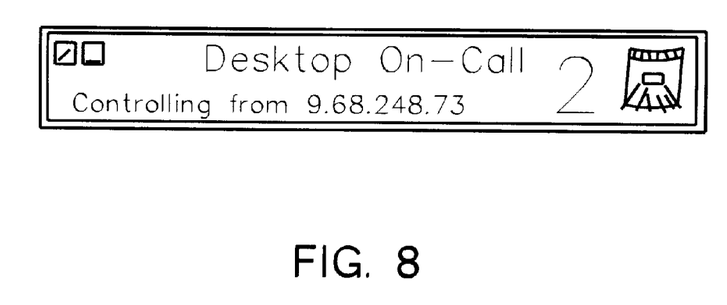
FIG. 8 is a chart showing an example of delta data (D') outputted by the delta detecting part 232 shown in FIG. 2.

FIG. 8 is a chart showing an example of delta data (D') outputted by the delta detecting part 232 shown in FIG. 2.

The delta detecting part 232 calculates the delta between the full color image data inputted from the image storing part 222 (R, k−1) and the reduced color image data inputted from the image storing part 230 (16, k−2) for each pixel and outputs it to the input terminal a of the output control part 234 as delta data (D') (S232). The output control part 234 is provided with a timer or a counter (not shown) and uses the timer or the counter to determine that there is almost no change in full color image data when the accumulation of the absolute values of the full color delta data inputted from the delta detecting part 236 stays below a preset threshold value during a predetermined period (N), for example, over more than 10 seconds. The output control part then selects delta data (D') inputted from the input terminal a, while selecting reduced color delta data (16, D) inputted from the terminal b otherwise, generates transmission data with an associated identifier of respective data, and outputs it to the computer unit 28 (FIG. 1) (transmission process). Unless otherwise mentioned, a case where the output control part 234 is provided with a timer is described as an example. The output control part 234 also effects start and end transmission processes under the control of the control part 238.

Format of Data Outputted by Output Control Part 234

Figure 9:
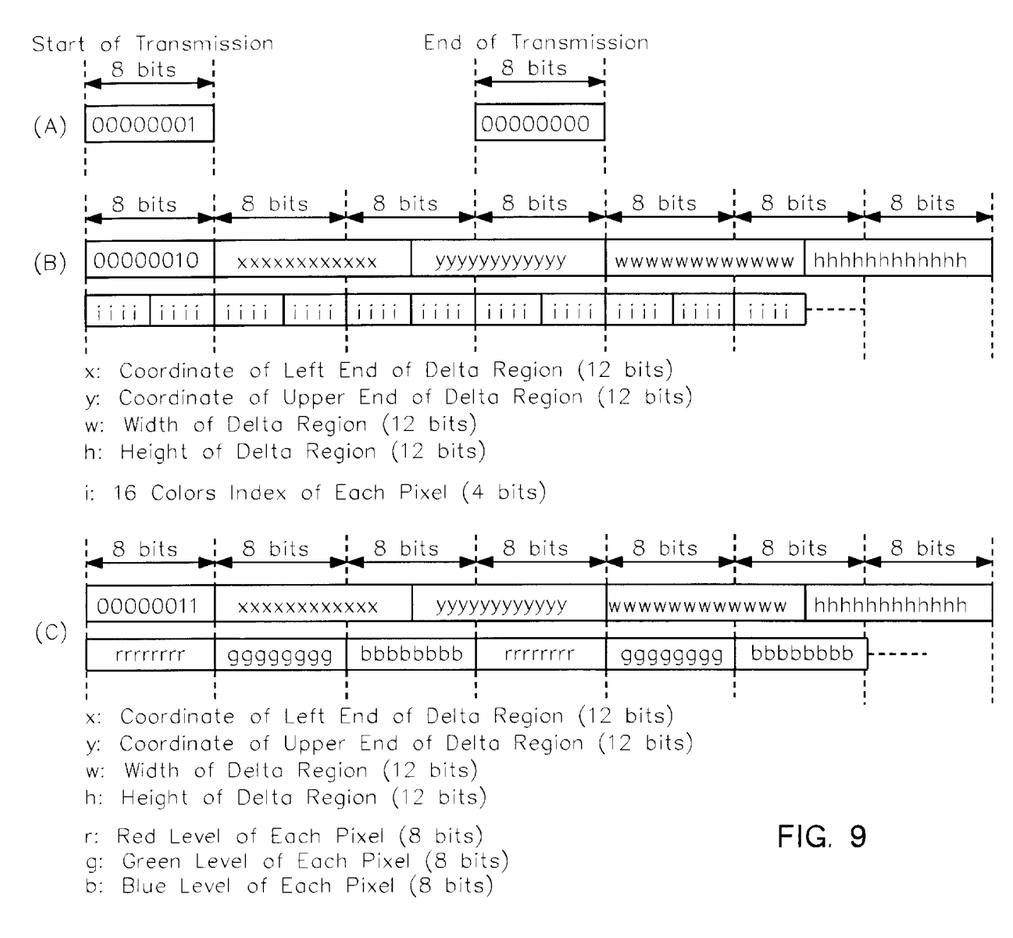
FIG. 9(A) to (C) are charts showing an example of the format of data outputted by the output control part 234 shown in FIG. 2; 9(A) shows the format of data indicating the start of transmission and data indicating the end of transmission, 9(B) shows the format of data which the output control part 234 outputs when selecting reduced color delta data (16, D), and 9(C) shows the format of data which the output control part 234 outputs when selecting delta data (D')

The process in the output control part 234 is now further described. FIG. 9(A) to (C) are charts showing examples of the format of data outputted by the output control part 234 shown in FIG. 2. FIG. 9(A) shows the format of data indicating the start of transmission and data indicating the end of transmission. FIG. 9(B) shows the format of data which the output control part 234 outputs when selecting reduced color delta data (16, D). FIG. 9(C) shows the format of data which the output control part 234 outputs when selecting delta data (D').

The output control part 234 outputs "start of transmission" data (01h) upon the start of transmission and "end of transmission" data (00h) upon the end of transmission to the computer unit 28 in response to the control of the control part 238. When the output control part 234 sends reduced color delta data (16, D), it generates transmission data with which is associated region data (x, y, w, h) indicating in which region the reduced color delta data is on the screen and an identifier (02h) indicating that the data is reduced color delta data as shown in FIG. 9(B).

When the output control part 234 sends delta data (D'), it generates transmission data with which is associated region data (x, y, w, h) indicating in which region the delta data is on the screen and an identifier (03h) indicating that the data is delta data.

Delta Detecting Part 236

Reference is made to FIG. 2 again. The delta detecting part 236 calculates an accumulation of the absolute values of full color delta data inputted from the delta detecting part 224 for each pixel, for example, and outputs it to the output control part 234.

Control Part 238

The control part 238 controls the operation of the components of the transmission image processing device 22. Specifically, the control part 238 controls to clear the stored contents of the image storing part 220, 222, 230, to store inputted image data, and to output stored image data. The control part 238 also controls the output control part 234 in accordance with the operation by a user to have it effect start of transmission, transmission, and end of transmission of image data.

Receiving Side Device 3

Reference is made to FIG. 1 again. As shown in FIG. 1, the receiving side device 3 comprises a communication device 32, a storage device 36, a computer unit (CPU) 38, a received image processing device 40, a VRAM 342, a display device 344 using a CRT and the like and an input device 380.

Computer Unit 38

In the receiving side device 3, the computer unit 38 controls the communication device 32 to receive transmission data [FIG. 9(A), (B)] transmitted from the transmitting side device 2 via the network 10 and to decode it for output to the received image processing device 40. The computer unit 38 also stores software for implementing the function of the received image processing device 40, when the function of the received image processing device 40 is implemented by software, and loads the stored software to the received image processing device 40 for execution in response to a call operation effected by the user to input device 380 (keyboard, mouse, etc.).

Received Image Processing Device 40

Figure 10:
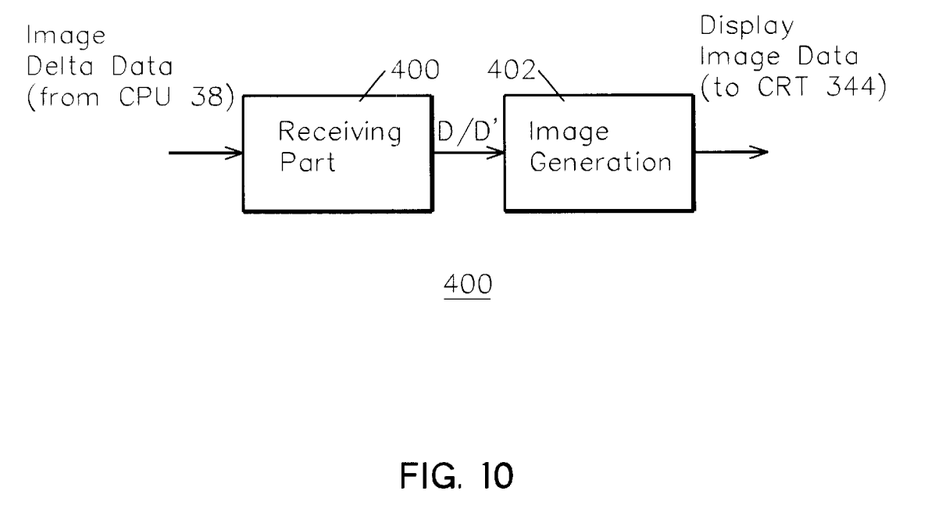
FIG. 10 is a diagram showing the configuration of the received image processing device shown in FIG. 1.

FIG. 10 is a diagram showing the configuration of the received image processing device shown in FIG. 1. As shown in FIG. 10, the received image processing device 40 comprises a receiving part 400 and an image generating part 402. With these components, the received image processing device 40 displays an image of transmission data transmitted from the transmitting side device 2 in the display device 344.

Receiving Part 400

The receiving part 400 separates delta data (D'; FIG. 2) or reduced color delta data (16, D; FIG. 2) and an identifier included in the transmission data [FIG. 9(A),(B)] received by the computer unit 38, and outputs them to the image generating part 402.

Image Generating Part 402

The image generating part 402 displays all or a part of an image so far displayed in the display device 344 which is modified using delta data (D') or reduced color delta data (16, D).

Operation of Image Data Communication System 1

Process in the Side of Transmitting Device 2

Figure 11:
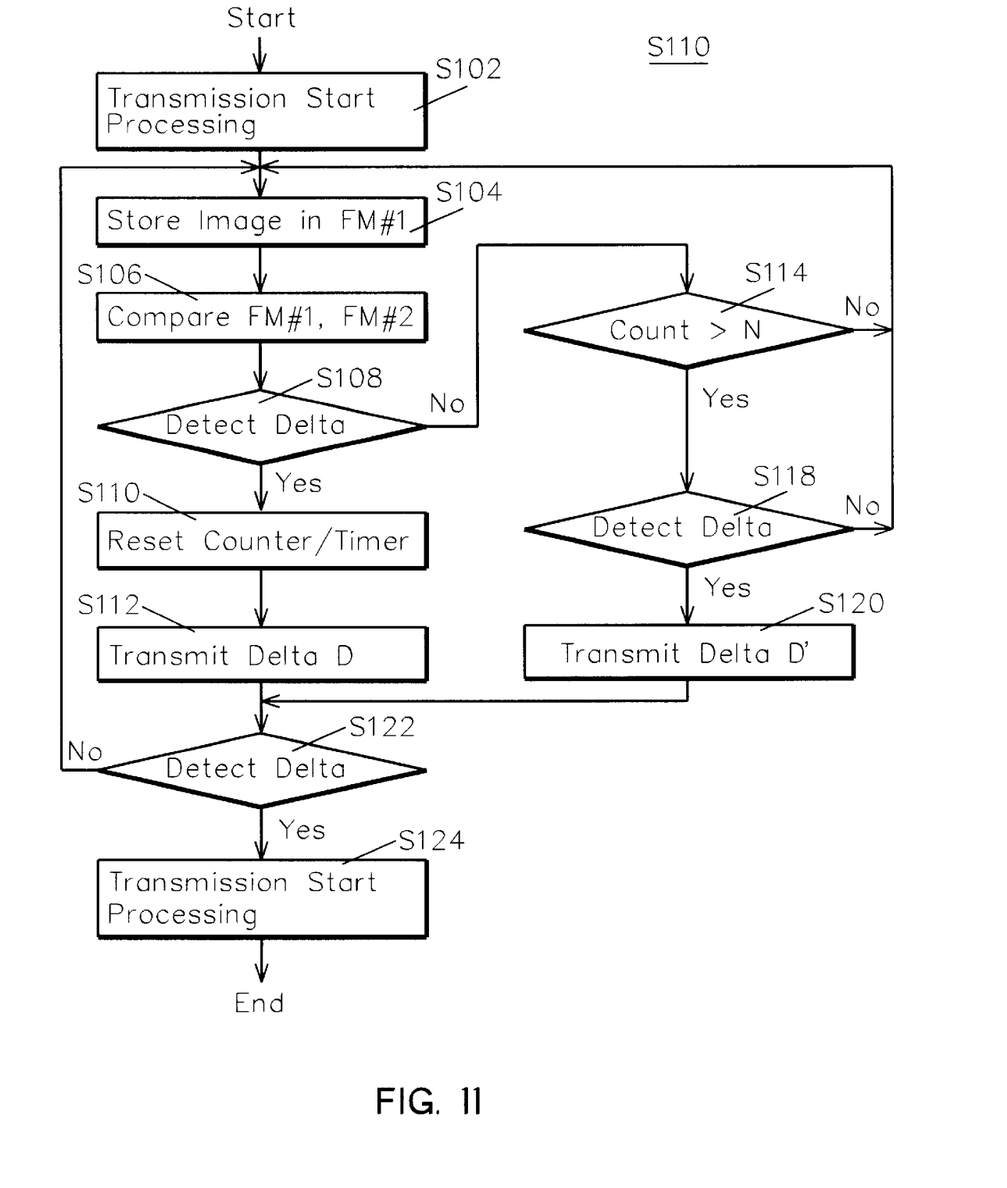
FIG. 11 is a flow chart (S100) showing the process in the transmission image processing device 22 shown in FIG. 1.

The operation of the side of the transmitting device 2 is described with reference to FIG. 11. FIG. 11 is a flow chart (S100) showing the process in the transmission image processing device 22 shown in FIG. 1. When the computer unit 38 starts the transmission image processing device 22 in response to user input at the input device 280, the control part 238 of the transmission image processing device 22 (FIG. 2) controls the output control part 234 to have it transmit a "start of transmission" signal shown in FIG. 9(A) to the receiving side device 3 via the network 10 in step 102 (S102) as shown in FIG. 11. In addition, the control part 238 performs an initializing process of the components of the transmission image processing device 22, such as clearing the timer of the output control part 234 and the content of the image storing part 220, 222, 230 to zero. In step 104 (S104), the image storing part 220 (FM#2) takes in full color image data inputted from the image generating device 20 for storage therein.

In step 106 (S106), the delta detecting part 224 compares full color image data (R, k) stored in the image storing part 220 (FM#1) with full color image data (R,k−1) stored in the image storing part 222 (FM#2) to calculate a delta for generating full color delta data (R, D; S224) and outputs it to the color reduction conversion part 228 and the delta detecting part 236.

The delta detecting part 236 evaluates an accumulation of the absolute values of the delta of full color delta data, to detect a change in the image, and outputs the result of the detection to the output control part 234. The color reduction conversion part 226 reduces the number of colors of the full color image data (R, k−1) stored in the image storing part 222 to generate reduced color image data (16, k−1) and outputs it to the image storing part 230. The image storing part 230 stores inputted reduced color image data (16, k−1) while the delta detecting part 232 calculates the delta between the reduced color image data (16, k−1) stored in the image storing part 230 and the full color image data (R, k−1) stored in the image storing part 222, to generate delta data (D'), and outputs it to the input terminal a of the output control part 234.

The color reduction conversion part 228 reduces the number of colors of the full color delta data (R, D) inputted from the delta detecting part 224 to generate reduced color delta data (16, D) and outputs it to the input terminal b of the output control part 234.

The First Transmission Data

When the image storing part 220 takes in the first full color image data to store it (k=1), the content of the image storing part 222 has been cleared to zero so that the content of the first full color image data (R, k) is outputted from the delta detecting part 224 as it is as full color delta data. Therefore, because the delta detecting part 236 detects a change of the image when the first full color image data is inputted, the output control part 234 transmits transmission data including reduced color delta data [16, D; FIG. 9(B)] as the first transmission data except for a special case.

In step 108 (S108), the output control part 234 determines whether or not the delta detecting part 236 detects a change in the image. The output control part 234 proceeds to the process of S110 when a change in the image is detected, while it proceeds to the process of S114 otherwise. In step 110 (S110), the output control part 234 clears the timer to zero. In step 112 (S112), the output control part 234 selects reduced color delta data inputted from the input terminal b (16, D), to generate transmission data, and transmits it to the receiving side device 3.

In step 114 (S114), the delta detecting part 224 determines whether or not the value of the timer of the output control part 234 is larger than a preset value N (a value indicating 10 seconds, for example). The delta detecting part 224 proceeds to the process of S118 when the value of the timer is larger than N, while it returns to the process of S104 otherwise.

In step 118 (S118), the output control part 234 determines whether or not the delta detecting part 236 detects a change in the image. The output control part 234 proceeds to the process of S120 when the delta detecting part 236 detects a change in the image, while it returns to the process of S104 otherwise. In step 120 (S120), the output control part 234 selects delta data (D') to generate transmission data and transmits it to the receiving side device 3.

In step 122 (S122), the control part 238 determines whether or not there is operation input indicating the end of transmission from the computer unit 28 and proceeds to the process of S124 when there is an operation to that effect or when the image data has been completely transmitted while it returns to the process of 104 otherwise. In step 124 (S124), the control part 238 controls the output control part 234 to have it transmit the end of transmission signal shown in FIG. 9(A) to the receiving side device 3 and ends the transmission process. It is to be noted that a process of having the transmission image processing device 22 transmit full color image data to the receiving side device 3 may be added to the above described process.

Process in the Receiving Side Device 3

Figure 12:
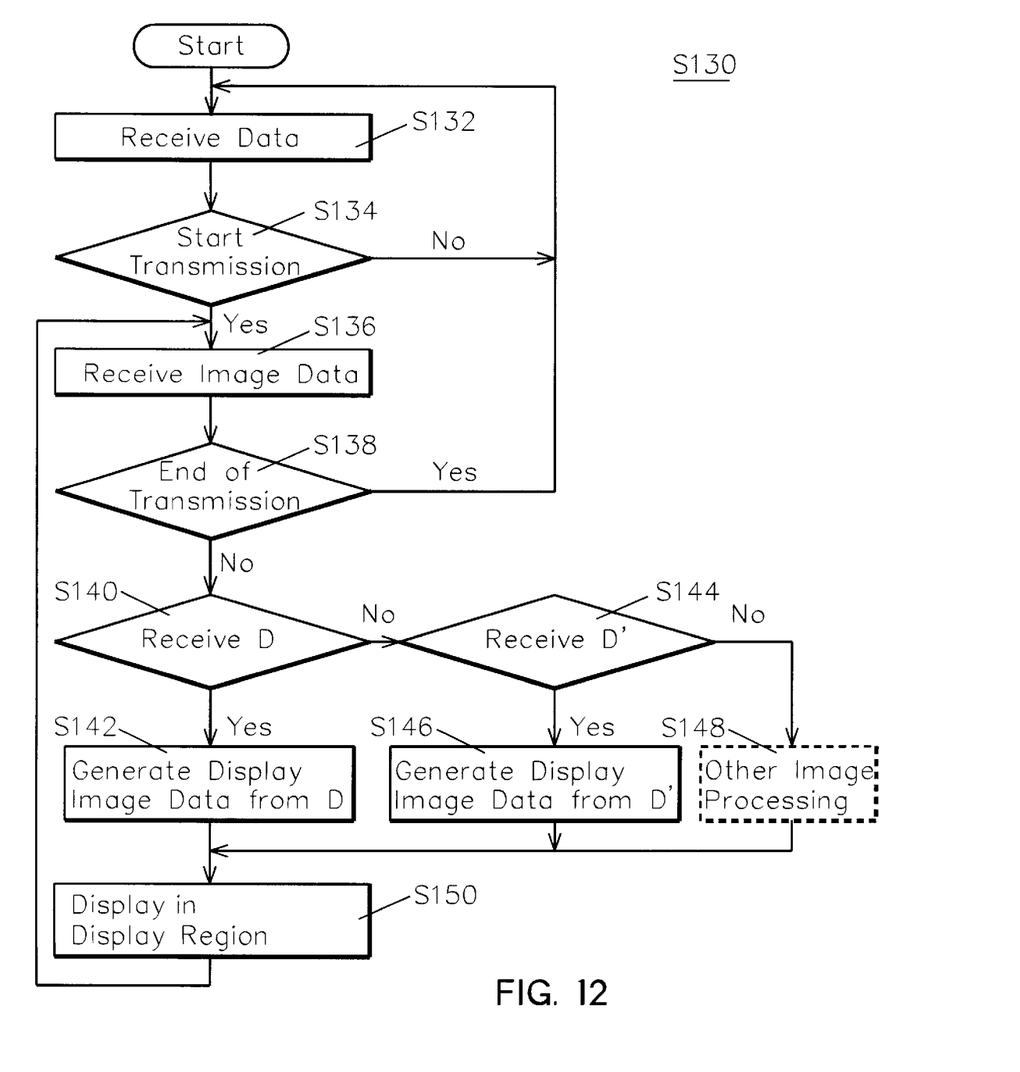
FIG. 12 is a flow chart (S130) showing the process in the received image processing device 40 shown in FIG. 1.

The process in the receiving side device 3 is now described with reference to FIG. 12. FIG. 12 is a flow chart (S130) showing the process in the received image processing device 40 shown in FIG. 1. As shown in FIG. 12, in step 132 (S132), the receiving part 400 (FIG. 10) receives data transmitted from the transmitting side device 2 via the computer unit 38 [the data may not be the data shown in FIG. 9(A) to (C)]. In step 134 (S134), the receiving part 400 determines whether or not the received data is the start of transmission data shown in FIG. 9(A). If the received data is the start of transmission data, the receiving part 400 proceeds to the process of S136 while it proceeds to the process of S132 otherwise.

In step 136 (S136), the receiving part 400 receives transmission data including reduced color delta data, delta data and other image data (full color image data and the like), or the "end of transmission" data, from the transmitting side device 2 and outputs them to the image generating part 402. In step 138 (S138), the image generating part 402 determines whether or not the received data is the "end of transmission" data. When the received data is the "end of transmission" data, the image generating part 402 returns to the process of S132, while it proceeds to the process of S140 otherwise.

In step 140 (S140), the image generating part 402 evaluates the identifier included in the received transmission data and determines whether or not the received data includes reduced color delta data (D). When the received data includes reduced color delta data, the image generating part 402 proceeds to the process of S142, while it proceeds to the process of S144 otherwise. In step 142 (S142), the image generating part 402 generates image data, which causes the image data indicating the image of the received reduced color delta data (D) to be displayed in the region indicated by region data [FIG. 9(B), (C)], and displays it in the display device 344.

In step 144 (S144), the image generating part 402 evaluates the identifier included in the received transmission data and determines whether or not the received data includes delta data (D'). When the received data includes delta data, the image generating part, 402 proceeds to the process of S146, while it proceeds to the process of S148 otherwise. In step 146 (S146), the image generating part 402 modifies the image data stored in the VRAM 342 using the delta data (D') and displays it in the display device 344. In step 148 (S148), the image generating part 402 writes other image data transmitted from the transmitting side device 2 into all or a part of the VRAM 342 to display it in the display device 344 (for example, the image generating part 402 replaces a part of full color image data with a part of the image so far displayed for display in the display device 344).

As described in the above, the image data communication system 1 of this invention allows many frames of reduced color delta data, of a small data amount, to be transmitted to the receiving side device 3 in a given time during a period where there are many changes in the image, to have a limited bandwidth (transmission rate) of the communication network 10 conform to the variation of the image.

On the other hand, because the image data communication system 1 transmits delta data of a large data amount from the transmitting side device 2 to the receiving side device 3 during a period where there is a small variation in the image, the receiving side device 3 can display an image of high quality.

In addition, because the transmitting side device 2 automatically switches between the reduced color delta data and the delta data in transmission without requiring the user in the receiving side device 3 to monitor the change of the displayed image to manually change the quality of the image, the user intervention can be eliminated.

While the image data communication system 1 is particularly suitable for transmitting a GUI image and the like which includes a relatively small change over an extended time period, it may be adapted to the transmission of an image taken by a digital video camera or a digital camera.

While the above description referred to a case where reduced color delta data (D) and delta data (D') are consistently generated for selection by the output control part 234 in the transmission image processing device 22, only the delta data may be generated when the output control part 234 does not detect a change in the image during a given period while only the reduced color delta data may be generated when a change is detected during a given period. By so modifying the process in the transmission image processing device 22, the amount of required processing can be advantageously reduced when the transmission image processing device 22 is implemented by a software.

Also, the operation of the transmission image processing device 22 may be modified such that it transmits the very input image data to the receiving side device 3 with an identifier indicating the input image data associated therewith in place of the delta data (D') by increasing the kinds of the identifiers shown in FIG. 9(B), (C) to modify the operation of the receiving side device 3 such that it displays the received input image data in place of the reduced color delta data so far displayed.

As described in the above, the image data transferring system, the image transferring apparatus and the method thereof of this invention allow image data to be efficiently transferred via a network. The image data transferring system, the image transferring apparatus and the method thereof of this invention can optimize the quality of an image and the change of the image depending on the bandwidth (transmission rate) of the network by adjusting the amount of image data depending on the change of the image, i.e., transmitting more images with a less amount of data when images of many changes are transmitted while transmitting a high quality image with a larger amount of data when the change of the image is less.

The image data transferring system, image data transferring apparatus and method thereof of this invention can automatically switch between an image of reduced color and an image of color which is not reduced for displaying the image without requiring the user to operate depending on the change.

The image data transferring system, image data transferring apparatus and method thereof of this invention can adjust the amount of image data depending on the movement of the image and transmit an image of a necessary and sufficient quality from a transmitting side to a receiving side to reduce the load on a server device supplying the image data and the network.

The invention has been described with reference to several specific embodiments. One having skill in the relevant art will recognize that modifications may be made without departing from the spirit and scope of the invention as set forth in the claims.

Having thus described our invention, what we claim as new and desire to secure by Letters Patent is:

1. An image data transferring system for transferring data from an image data transmitting apparatus to an image data receiving apparatus, said image data transmitting apparatus comprising;

reduced data generating means for selectively generating reduced data by reducing the amount of data of continuously input image data;

delta data generating means for generating delta image data of the difference between said input image data and said reduced data;

delta detection means for detecting a delta between consecutive ones of said input image data;

image data transmitting means for transmitting to said image data receiving means transmission data comprising first identifier data attached thereto indicating that it is said delta data when no delta is detected between consecutive ones of said input data for a predetermined period, and transmitting transmission data comprising second identifier data attached thereto indicating that it is said reduced data when a delta is detected between consecutive ones of said input data for a predetermined period; and image data receiving apparatus comprising transmission data receiving means for receiving said transmission data, and image displaying means for displaying an image indicated by said reduced data included in said transmission data when said second identifier data of the received transmission data indicates that it is said reduced data and displaying the image indicated by said reduced data with the image indicated by said delta data added thereto when said first identifier data of the received transmission data indicates that it is said delta data.

2. An image data transferring apparatus for transmitting transmission data to an image data receiving apparatus which receives said transmission data and displays an image indicated by said transmission data, said image transferring apparatus comprising:

reduced data generating means for selectively generating reduced data by reducing the amount of data of input image data;

delta data generating means for generating delta data representing the difference between input image data and reduced data;

delta detection means for detecting a delta between consecutive ones of said input data; and image data transmitting means for transmitting to said image data receiving apparatus transmission data comprising first identifier data attached thereto indicating that it is said delta data when no delta is detected between consecutive ones of said input data for a predetermined period, and transmitting transmission data comprising second identifier data attached thereto indicating that it is said reduced data when delta is detected between consecutive ones of said input data for a predetermined period.

3. The image data transferring apparatus of claim 2 wherein said reduced data generating means is adapted to generate reduced color data having data amount reduced by reducing the number of colors of said input image data as said reduced data, said delta data generating means is adapted to generate said delta data indicating the delta between said input image data and said reduced color data, said delta detection means is adapted to detect said delta when there is a delta between said input image data and the input image data inputted before or after said former input image data, and said image data transmitting means transmits one of said reduced color data and said delta data.

4. The image data transferring apparatus of claim 2 wherein said delta data generating means further comprises storage means and wherein said delta data generating means is adapted to store said inputted input image data to generate input delta data indicating a delta between stored first input image data and second input image data which is inputted after said stored first input image data and generates reduced color data by reducing the number of colors of said generated input delta data, and wherein said delta data generating means is adapted to reduce the number of colors of said stored first input data to generate said delta data by taking the delta between said first input image data and said color reduced first input data.

5. The image data transferring apparatus of claim 2 wherein said image data receiving apparatus displays the image indicated by said reduced data with an image indicated by reduced data which is received later than said former reduced data added thereto.

6. An image data transferring method for transferring data from an image data transmitting apparatus to an image data receiving apparatus, said method comprising the steps effected in said image data transmitting apparatus of:

selectively generating reduced data by reducing the amount of data of continuously inputted input image data;

generating image delta data of the difference between said input image data and said reduced data;

detecting a delta between consecutive ones of said input image data;

transmitting to said image data receiving apparatus transmission data comprising first identifier data attached thereto indicating that it is said delta data when no delta is detected between consecutive ones of said input data for a predetermined period and transmitting transmission data comprising second identifier data attached thereto indicating that it is said reduced data when a delta is detected between consecutive ones of said input data for a predetermined period; and the steps effected in said image data receiving apparatus of:

receiving said transmission data; and displaying an image indicated by said reduced data included in said transmission data when said identifier data of the received transmission data indicates that it is said reduced data and displaying the image indicated by said reduced data with the image indicated by said delta data added thereto when said identifier data of the received transmission data indicates that it is said delta data.

7. A recording medium recording a program which causes a computer to execute a method in an image data transferring apparatus for transmitting transmission data to an image data receiving apparatus which receives said transmission data and displays an image indicated by said transmission data, said method comprising the steps of:

a reduced data generating step for selectively generating said reduced data;

a full color image data generating step for generating said full color image data;

a delta detection step for detecting a delta between consecutive ones of said input data; and an image data transmitting step for transmitting to said image data receiving apparatus transmission data comprising first identifier data attached thereto indicating that it is said delta data when no delta is detected between consecutive ones of said input data for a predetermined period and transmitting transmission data comprising second identifier data attached thereto indicating that it is said reduced data when a delta is detected between consecutive ones of said input data for a predetermined period.

8. The recording medium of claim 7 wherein said full color image data is delta data of a delta between said input image data and said reduced data and said image data receiving apparatus displays an image indicated by said reduced data with an image indicated by said delta data when said identifier data indicates said delta data, said medium recording a program which further causes said reduced data generating step to execute a process of generating color reduced data having a data amount reduced by reducing the number of colors of said input image data as said reduced data, causes said full color image data generating step to execute a process of generating said delta data indicating the delta between said input image data and input image data inputted before or after the former input image data, causes said delta detecting step to execute a process of detecting said delta when there is a delta between said input image data and input image data inputted before or after the former input image data, and causes said image data transmitting step to execute a process of transmitting said color reduced data or said delta data with said identifier data associated thereto as said transmission data depending on whether or not a delta is detected in the input image data.

* * * * *